US010158597B2

(12) United States Patent
Foris et al.

(10) Patent No.: US 10,158,597 B2
(45) Date of Patent: Dec. 18, 2018

(54) MOTOR VEHICLE COMPRISING AN OPERATING DEVICE FOR OPERATING AN INTERNET PORTAL OF A SOCIAL NETWORK SERVICE

(71) Applicant: AUDI AG, Ingolstadt (DE)

(72) Inventors: Edwin Foris, Unterneuhausen (DE); Arne Zoerb-Schliefer, Pettstadt (DE)

(73) Assignee: AUDI AG, Ingolstadt (DE)

( * ) Notice: Subject to any disclaimer, the term of this patent is extended or adjusted under 35 U.S.C. 154(b) by 308 days.

(21) Appl. No.: 14/443,854

(22) PCT Filed: Oct. 18, 2013

(86) PCT No.: PCT/EP2013/003140
§ 371 (c)(1),
(2) Date: May 19, 2015

(87) PCT Pub. No.: WO2014/079526
PCT Pub. Date: May 30, 2014

(65) Prior Publication Data
US 2015/0304267 A1 Oct. 22, 2015

(30) Foreign Application Priority Data

Nov. 21, 2012 (DE) .......................... 10 2012 022 796

(51) Int. Cl.
*H04L 12/18* (2006.01)
*G06Q 50/00* (2012.01)
(Continued)

(52) U.S. Cl.
CPC ............. *H04L 51/32* (2013.01); *G06Q 10/20* (2013.01); *G06Q 50/01* (2013.01); *G08G 1/0962* (2013.01)

(58) Field of Classification Search
CPC ........ G06Q 50/01; G06Q 10/20; H04L 51/32; G08G 1/0962
See application file for complete search history.

(56) References Cited

U.S. PATENT DOCUMENTS 8,571,724 B2    10/2013   Brennan et al.
2008/0172496 A1*  7/2008  Middleton ............. G06Q 30/02
                                                              709/246
(Continued)

FOREIGN PATENT DOCUMENTS

CN           101035096        9/2007
CN           102647633        8/2012
(Continued)

OTHER PUBLICATIONS

AppAppeal (Ping.fm, Social Network Content Updating; published 2010, pp. 1-3; ping-fm.appappeal.com).*
(Continued)

*Primary Examiner* — Amy Ng
*Assistant Examiner* — Tan H Tran
(74) *Attorney, Agent, or Firm* — Staas & Halsey LLP

(57) ABSTRACT

A method controls an Internet portal for a social network service from a motor vehicle. The Internet portal provides functions that can be activated by sending a control command to the Internet portal. An immobile proxy device provides a module that receives a selection, which is made by a user in the motor vehicle, for one of the functions and then sends a control command, which is specific to the Internet portal, for activating the function to the Internet portal. The module also produces suitable display data for the motor vehicle from output data from the Internet portal. The module also receives additional data from an additional (Continued)

data source and produces an additional control command for the Internet portal and/or display data for the motor vehicle therefrom.

17 Claims, 1 Drawing Sheet

(51) Int. Cl.
*G06Q 10/00* (2012.01)
*H04L 12/58* (2006.01)
*G08G 1/0962* (2006.01)

(56) References Cited

U.S. PATENT DOCUMENTS

| | | | |
|---|---|---|---|
| 2009/0249296 A1 | 10/2009 | Haenel et al. | |
| 2013/0018948 A1* | 1/2013 | Douillet | G06F 9/541 709/204 |
| 2013/0066947 A1* | 3/2013 | Ahmad | G06F 9/44526 709/203 |
| 2013/0086164 A1* | 4/2013 | Wheeler | C08L 61/06 709/204 |
| 2013/0124006 A1* | 5/2013 | Anantha | G06Q 50/01 701/1 |
| 2013/0176333 A1* | 7/2013 | Agar | H04N 1/00167 345/629 |
| 2014/0164579 A1* | 6/2014 | Douthitt | G07C 5/008 709/219 |

FOREIGN PATENT DOCUMENTS

| | | |
|---|---|---|
| CN | 102710748 | 10/2012 |
| DE | 102009042664 | 4/2011 |
| DE | 102009042664 A1 | 4/2011 |
| DE | 102011008569 | 10/2011 |
| DE | 102011112537 | 3/2012 |
| DE | 102011112677 | 5/2012 |
| DE | 102012005012 | 9/2012 |
| DE | 102012022796.5 | 11/2012 |
| WO | 2011/044692 | 4/2011 |
| WO | 2011/044692 A1 | 4/2011 |
| WO | PCT/EP2013/003140 | 10/2013 |

OTHER PUBLICATIONS

McCall (Youtube Ping.fm https://www.youtube.com/watch?v=DM3cEhv6eBs; Published Jun. 7, 2008).*
WIPO English Language Translation of the International Preliminary Report on Patentability for PCT/EP2013/003140, dated May 28, 2015, 6 pages.
"Der Mini twitter, plappert und macht Musik," Heise Autos, May 27, 2011, http://www.heise.de/autos/artikel/Der-Mini-twittert-plappert-und-macht-Musik-1251830.html?artikelseite=4, 13 pages.
German Office Action for German Priority Patent Application No. 10 2012 022 796.5, dated Aug. 2, 2013, 7 pages.
English language of International Search Report for PCT/EP2013/003140; dated Feb. 20, 2014, 2 pages.
Chinese Office Action dated Apr. 20, 2017 in corresponding Chinese Patent Application No. 201380060571.8.
European Office Action dated Apr. 20, 2018 in corresponding European Patent Application No. 13785820.5.

* cited by examiner

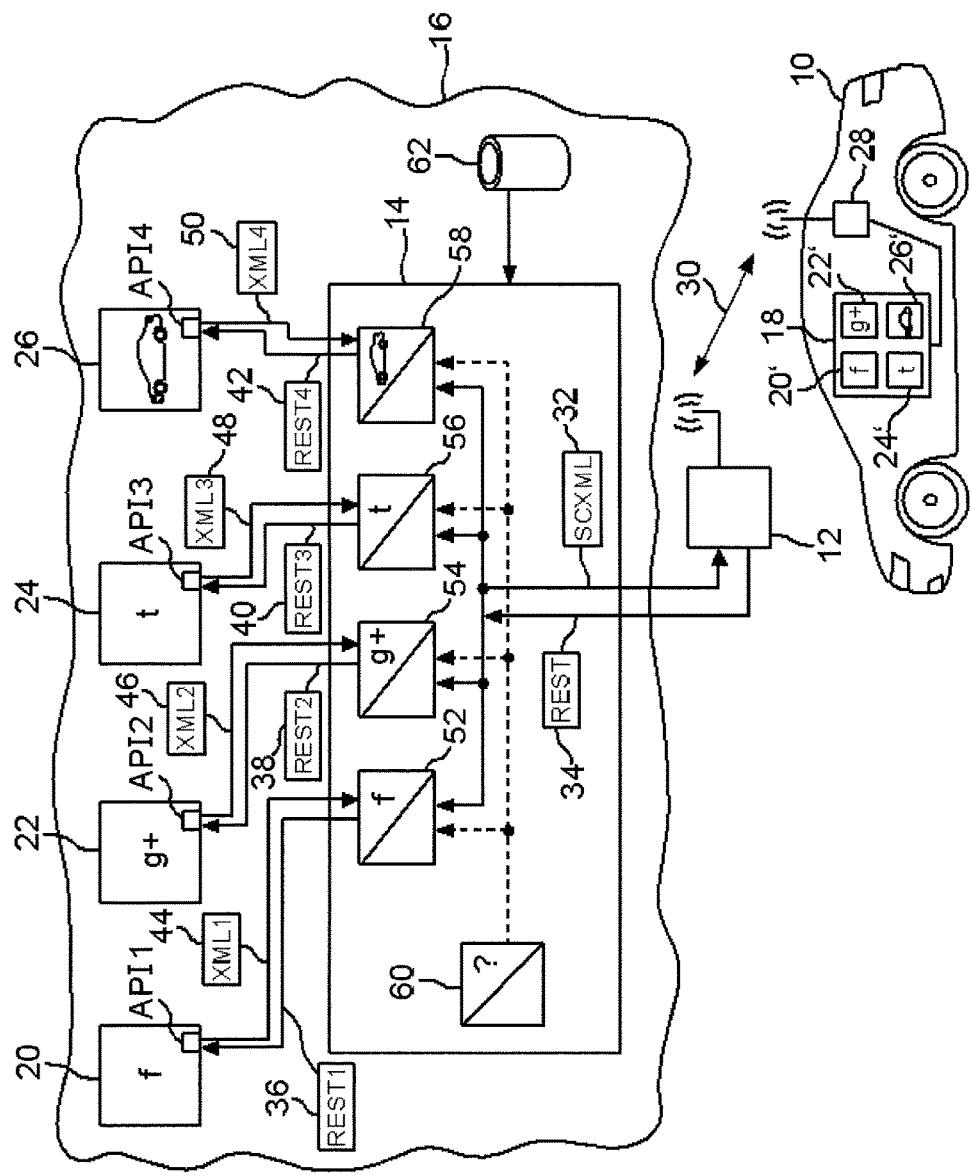

_US 10,158,597 B2_

MOTOR VEHICLE COMPRISING AN OPERATING DEVICE FOR OPERATING AN INTERNET PORTAL OF A SOCIAL NETWORK SERVICE

CROSS REFERENCE TO RELATED APPLICATIONS

This application is based on and hereby claims priority to International Application No. PCT/EP2013/003140 filed on Oct. 18, 2013 and German Application No. 10 2012 022 796.5 filed on Nov. 21, 2012, the contents of which are hereby incorporated by reference.

BACKGROUND

The invention relates to a method for controlling an Internet portal for a social network service from a motor vehicle. The invention also includes a server arrangement for the Internet.

A social network service is understood to mean a communication platform that a unified group of people who are all registered with the communication platform by a profile can use to exchange information. By way of example, the messages may be texts or images. Internet portals of such social network services are known under the name "Facebook"®, "Google+"® and "Twitter"®, for example.

A method of the cited type is known from DE 10 2009 042 664 A1, for example. The cited document describes how an automated process in a motor vehicle can involve an instantaneous operating state of the motor vehicle, for example the speed thereof, being taken as a basis for producing a message that the user of the motor vehicle can then transmit to an Internet portal for a social network service via the Internet during the journey. This allows the user, without becoming too greatly distracted in the process, to inform other people about his progress on the route, for example.

Internet portals for social network services are normally controlled by a user from a computer by an Internet browser. The operators of the different Internet portals normally provide a special service program (known as an "app"), for example for smartphones, however, that is specialized for control of the respective Internet portal and to this end uses a control interface (API—Application Programming Interface) of the Internet portal. Such a control interface (API) can be used to activate the individual functions provided by the Internet portal by sending a control command to the Internet portal. By way of example, such a function may be the reading of profile data for the user, which profile data describe the personal profile of the user in the respective social network. The entry of a message (what is known as posting) in the social network is also a function that can be used on the basis of the API.

In order for a user to be able to control an Internet portal for a social network service from a motor vehicle, it is likewise possible for an appropriate "app" specialized for an Internet portal to be provided, for example by an infotainment system or a combination instrument. In this case, however, it has been found to be problematical to allow the user to install the respective "app" for user control of his favorite Internet portal for a social network service in the motor vehicle. Incorrect operation by the user can result in the infotainment system then no longer working in the manner that the manufacturer of the motor vehicle desires, for example. Even renewing the program code of such an "app" (what is known as an update) is associated with very much more complexity for user apparatuses in a motor vehicle than replacement of an "app" on a smartphone, for example. In addition, an "app" normally needs to be developed by the motor vehicle manufacturer itself or one of its suppliers, since the special circumstances in the motor vehicle (screen dimensions of the infotainment system or combination instrument, the processors used and the operating system used) require separate programming.

Each Internet portal normally has specific commands for the same functions, which are different than the commands at the other Internet portals. In a motor vehicle, it is therefore necessary for an "app" to be developed separately for each Internet portal that is meant to be able to be controlled by the user from a motor vehicle, since the control interfaces (APIs) of the Internet portals are different. It is also possible for a single application to be provided that can be used to allow access to a plurality of Internet portals. This application then uses a plurality of APIs.

SUMMARY

One possible object relates to allowing user control of an Internet portal for a social network service from a motor vehicle using low technical complexity.

The inventors propose a method for operating a server device, which in this case is called a proxy device. A server device is intended to be understood to mean a data processing device that is designed for protocol-controlled data interchange with computers or mobile terminals, that is to say smartphones or an infotainment system of a motor vehicle, for example, via the Internet. The proxy device is operated on the basis of the method as an immobile server device that regulates the communication between at least one Internet portal for a social network service, on the one hand, and the motor vehicle, on the other hand. In this context, immobile is intended to mean that the proxy device is not part of the motor vehicle.

The proposed method provides for the proxy device to send the control commands to an Internet portal on behalf of the motor vehicle. Which commands are intended to be sent is selected by the user using a module of the proxy device. The module then translates the selection command into the control command, as is specific to the Internet portal, in order to activate the selected function at said Internet portal. Equally, the module takes output data that are transmitted in a specific format by the Internet portal in response to the control command and produces graphical display data that can be presented in the motor vehicle by a display unit, e.g. a monitor. However, the module is not just a pure translation module for the purpose for which it has just been described. The module also receives additional data from an additional data source, e.g. a database or another module. On the basis of the additional data, the module then produces an additional control command for the Internet portal and/or additional graphical display data for the motor vehicle.

A module is intended to be understood to mean a functional module that comprises a group of functions that are used to regulate the communication between the motor vehicle and a particular Internet portal. By way of example, the functional module may be a program module that can be executed by a processor of the proxy device, or else may be a dedicated circuit, such as an ASIC (application specific integrated circuit). The module has a user interface that a driver of the motor vehicle uses to communicate with the module. The module uses the user interface to receive a selection for the functions of the Internet portal that the user would like to have performed. By way of example, the selection may comprise a selection command "Output the profile data" or "Post the following message . . . ". The selection is made by the user in the motor vehicle, and the motor vehicle then sends the corresponding selection command to the user interface of that module in the proxy device, which is responsible for the corresponding Internet portal. The module then takes the selection as a basis for selecting a control command, which is specific to the Internet portal, for activating the selected function and this selected control command is then sent to the Internet portal.

One potential advantage is that a single application having a module for user control of an Internet portal is now provided centrally in the proxy device for a multiplicity of motor vehicles. Such an application is easy to maintain. It requires no kind of alteration to the motor vehicle itself if the application is matched to an alteration in the API of the Internet portal by an "update", for example. Since a module also receives additional data, which come neither from the user in the motor vehicle nor from the Internet portal, and then integrates something into the datastream between motor vehicle and Internet portal in automated fashion, it is possible for the user control of an Internet portal to be made even more convenient for the user, and additional information can be incorporated that is tailored to the driver and is not part of such an Internet portal.

In this case, the aforementioned user interface of each module may likewise be an API that is provided by the module and to which the selection commands can be sent from the motor vehicle using an appropriate user program (for example of the infotainment system). If the API of an Internet portal changes, the API of the user interface can nevertheless remain the same.

In this connection, a development of the method provides for a module to provide the user interface in the motor vehicle in the same way graphically, however. This has the advantage that the graphical representation of the outputs produced by the Internet portal can also be controlled from the module of the proxy device in the motor vehicle and can thus likewise be updated by a simple "update" from the module.

In order to provide the user interface graphically in the motor vehicle, the development of the method provides for graphical display data to be produced for at least one control panel element for selecting one of the functions, that is to say for a "button" or an input panel, for example. The graphical display data are preferably produced on the basis of the SCXML standard (SCXML—State Chart XML, XML—Extensible Markup Language). The display data are simply sent to the motor vehicle for the purpose of displaying the at least one control panel element on a display device of the motor vehicle. By way of example, the user then sees a control panel element on the display device for the purpose of initiating the "Request profile" function. If he operates the control element, e.g. by clicking on it, the corresponding selection command is sent from the motor vehicle back to the application, which then produces the associated control command and sends it to the Internet portal.

An advantageous embodiment for specifically informing drivers of motor vehicles of a particular type and allowing them to exchange information with one another involves, by way of example, the motor vehicle manufacturer or an agency on behalf of the motor vehicle manufacturer providing a communication platform for the drivers, what is known as a "community", that can be accessed from the motor vehicle by a further module of the proxy device. This can advantageously allow the users exclusive access to this communication platform via the proxy device.

According to another development of the method, the proxy device additionally receives from a further, module-external data source, that is to say not from the Internet portal and not from the motor vehicle, further, motor-vehicle-specific data, which are intended for the motor vehicle, or data tailored to the user of the motor vehicle. These data then form a part of the additional data. By way of example, the external data source may be a database outside the proxy device, a database of the proxy device, a content management server, an Internet portal for another social network or for a communication platform for users of the proxy device. The motor-vehicle-specific data are then combined with other output data received from the Internet portal to form graphical display data. These display data are then, as described, sent to the motor vehicle. Hence, by displaying the display data in the motor vehicle, the output data from the Internet portal and the motor-vehicle-specific data are presented jointly. This results in the advantage that the user of the motor vehicle can additionally be supplied, during user control of the Internet portal, with information that is intended exclusively for him from the database. By way of example, this allows a motor vehicle manufacturer to obtain direct access to an owner of one of its motor vehicles. The information with which the motor vehicle user can be provided by this means is advertisement for events that are connected to the motor vehicle, offers and information tailored to the driver and his motor vehicle, for example. For drivers of a sports car of a particular type, it is thus possible, by way of example, to provide offers on winter tires specifically for this sports car in combination with free fitting on an exclusive basis. The fact that the motor-vehicle-specific or customer-specific data are added to the display data from the Internet portal by the proxy device advantageously ensures that these motor-vehicle-specific data do not appear in the social network, but rather are forwarded exclusively to the motor vehicle. This provides the drivers with exclusive advantages, since only they can see particular offers.

In relation to the transmission of the selection commands from the motor vehicle to the proxy device, it has been found to be particularly beneficial for these selection commands to be transmitted on the basis of the REST standard (REST—Representational State Transfer). Accordingly, each selection command is formulated as a URI (URI—Uniform Resource Identifier). In addition, the module ensures that this reacts to a selection command statelessly. Particularly in the case of the data connections that are sometimes unreliable in connection with communication by motor vehicles with the Internet during a journey, this is of particular advantage. In this case, connection termination does not result in an undesirable error state in the module.

In connection with the transmission of the control commands for the module to the Internet portal, it has been found to be particularly advantageous for the REST standard likewise to be used in this case. By way of example, a REST command may then also comprise data based on the JSON standard (JSON—JavaScript Object Notation) and based on the XML standard, however. The JSON standard lends itself in this case on account of the lower overhead in comparison with XML. The simple readability of the control commands that is ensured in this manner means that the check on the communication between the module and the Internet portal continues to be ensured when a module is developed for a new Internet portal.

In a preferred embodiment of the method, the proxy device provides not just a single module for user control of an individual Internet portal for a social network service but rather at least two modules, so that at least two different Internet portals can be controlled by the user from the motor vehicle, or different Internet portals from two motor vehicles. In this case, each of the modules may be formed in the manner already described. For each Internet portal, it is thus possible for a corresponding module to be provided for the user control thereof in the proxy device. In this case, the modules may be combined to form an application, that is to say a program, that provides all modules after starting. By way of example, a single application may be provided for "Foursquare"®, "Facebook"® and "Twitter"®. The application is executed by the processor unit of the proxy device. The proxy device is therefore a server arrangement.

In order to make the provision of a plurality of modules particularly inexpensive and low in terms of complexity, one development of the method provides for the at least two modules to be formed from a common module class. In this case, a module class means a program module or an IC circuit layout module (IC—Integrated Circuit) that comprises those parts that are common to all modules, that is to say particularly a standard user interface that regulates the communication between the module and the motor vehicle. Such a module class can then be matched to a specific Internet portal with relatively little work. This merely requires the addition of the control commands that are specific to the Internet portal and the linking of said control commands to the control elements of the standard user interface that the user is meant to be able to use to select the relevant function. By way of example, the use of a common profile view for different social networks or a common Java object in which all profile information is stored and can be read in a standard manner for each network by defined methods is very advantageous.

In connection with the provision of a plurality of modules, a further advantageous embodiment of the method is obtained when data are also interchanged between the modules. This development of the method provides for one of the modules to use its user interface to receive the selection for a particular function that the user would very much like to have performed, that is to say the "posting" of a message to friends whom the user would like to notify in different social networks, for example. The selection, i.e. in the example the "Post" selection command, is then transmitted from this module to the other modules. Each of the modules then produces, for the respective associated Internet portal, a corresponding, portal-specific control command for activating the function and sends it to the associated Internet portal. This results in the advantage that the single selection is used to activate the selected function at a plurality of Internet portals. In the cited example, the friends in all social networks thus receive the message sent by the user from the vehicle.

The proxy device described may be a device manufactured specifically for performing the method or else may be integrated in another device. Another such device that is suitable is a router or an Internet server, for example. In this connection, the inventors also propose a server arrangement that is designed to perform an embodiment of the method as a proxy device. The server arrangement is an individual server computer or a network of server computers or a router or a dedicated device designed for providing the functions of the proxy device described.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The single FIGURE shows a motor vehicle 10 which uses a mobile radio network 12 to communicate with a proxy server 14 that is part of the Internet 16.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The single FIGURE shows a motor vehicle 10 which uses a mobile radio network 12 to communicate with a proxy server 14 that is part of the Internet 16. The proxy server is an embodiment of the server arrangement. In the examples, the described components of the embodiments and elements of the methods are each individual features that can be considered independently of one another and that each also develop the proposals independently of one another and hence can also be regarded as part of the proposals individually or in a different combination than that shown. Furthermore, the described embodiments can also be augmented by further instances of the features that have already been described.

By way of example, the motor vehicle 10 may be an automobile. In the example shown, a driver (not shown) is sitting in the motor vehicle 10 and is using a user apparatus 18 to control one or more Internet portals 20, 22, 24 for social network services. By way of example, the user apparatus 18 may be an infotainment system having a screen on which the user apparatus 18 displays display data 20', 22', 24' for output data from the Internet portals 20, 22, 24 to the driver. In the FIGURE, display data that relate to the Internet portal 20 are provided with a prime-suffixed reference symbol 20'. The same applies to the remainder of the Internet portals 22, 24. By way of example, the display data 20', 22', 24' may each be a graphical representation of a respective profile page on the social network or also a representation of messages that friends of the driver have put on the social networks. By way of example, the user apparatus 18 may alternatively be a combination instrument in the motor vehicle 10 that has a screen that the driver sees behind the steering wheel of the motor vehicle 10 during the journey. The user apparatus can be controlled by the driver using a control stalk or a rotary/push control or a touchpad, for example.

The user apparatus 18 has used a mobile radio module 28 of the motor vehicle 10 to set up a mobile radio link 30 to the mobile radio network 12. The mobile radio network 12 and accordingly also the mobile radio module 28 can be operated on the basis of a standard that is known per se, for example UMTS, GSM, LTE.

The display data 20', 22', 24' that the user apparatus 18 displays on the screen do not come directly from the Internet portals 20, 22, 24 of the social networks. The user apparatus 18 also has no special programs designed for user control of one of the Internet portals 20, 22, 24. Instead, the production of the display data 20', 22', 24' and the user control of the Internet portals 20, 22, 24 are performed by the proxy server 14. The proxy server 14 may be a computer or a computer network that are part of the Internet 16. Alternatively, the proxy server 14 may be an appropriately set-up router, for example, or also a dedicated device having a signal processor or a microcontroller or a circuit with integrated circuits, for example. In particular, the proxy server 14 and generally the proxy device are a device that is different than those Internet servers that respectively provide one of the Internet portals 20, 22, 24.

The user apparatus 18 contains a piece of software that is designed to receive from the proxy server 14 display commands 32 with the display data 20', 22', 24' and to display the display data 20', 22', 24' on the screen in accordance with the display commands 32. By way of example, the display commands 32 may be based on the computer language SCXML. The display commands 32 can also produce, by way of example, user fields (not shown) on the screen that are able to be selected and activated by the driver. Activation of a user field prompts a respective selection command 34 to be sent from the user apparatus 18 to the proxy server 14 via the communication link 30. By way of example, the selection command 34 may be formed on the basis of the REST standard. Such a selection command 34 can instruct the proxy server 14 to activate at one of the Internet portals 20, 22, 24 one of the functions provided thereon. This requires the proxy server 14 to send a particular control command 36, 38, 40, 42 to a program interface API1, API2, API3, API4 of the respective Internet portal 20, 22, 24. In order to activate one and the same function at different Internet portals 20, 22, 24, it may be that the respective control command 36, 38, 40, 42 to be sent differs from Internet portal to Internet portal. Which control command is to be sent is stipulated by the respective programming interface API1, API2, API3, API4. The proxy server 14 thus has the task of translating the selection command 34, which the driver uses to indicate at which of the Internet portals 20, 22, 24 he would like to have which function activated, into a respective, specific control command 36, 38, 40, 42 and sending this control command 36, 38, 40, 42 to the Internet portal 20, 22, 24. In response to the reception of the respective control command 36, 38, 40, 42, the respective Internet portal 20, 22, 24 then produces respective output data 44, 46, 48, 50 with the information that the driver desires. These output data 44, 46, 48, 50 may likewise be stored in respective formats that are specific to the Internet portal 20, 22, 24. In the example shown, the proxy server 14 has received output data 44, 46, 48, 50 from each Internet portal 20, 22, 24 at different times in the course of the user control process and has converted them into respective corresponding graphical display data that are part of the display data 20', 22', 24'.

The presentation and control elements described that are displayed to the driver may be matched specifically for presentation on the screen of the user apparatus 18 in the motor vehicle 10 and to special features of the Internet portals 20, 22, 24. In this regard, the user apparatus 18 of the motor vehicle 10 obtains different modules 52, 54, 56, 58 from a web service of the proxy server 14, via which the proxy server 14 can be reached via the Internet 16. The modules are part of a server application 14 that is executed by the proxy server 14. That further programs executed by the server arrangement are of no significance for this description, the server application and the proxy server are provided with the same reference symbol 14 in the FIGURE. The modules 52 to 58 can be changed on the proxy server 14 in this case without the need for further changes in the user apparatus 18. There are therefore no changes to the vehicle software required for new or updated modules 52 to 58. The web service is developed such that each module 52 to 58 of a social network is set up on a common basic framework, which is called a module class 60 in this case. Hence, new modules can be integrated in a simple manner and common components of all modules 52 to 58 can be provided by the module class 60 and always reused for new modules. The module class 60 may furthermore comprise already existing, i.e. completely developed, display elements that can then be reused for any social network. Thus, the module class 60 may be designed to have graphical display data for displaying a profile page as a display element, for example. In addition, the functions of one social network can be used by other social networks and therefore do not need to be customized or reprogrammed for each module 52 to 58. For example, it is thus possible for a status report to be distributed to all available social networks via the modules 52 to 58 with a single action, i.e. a single selection command 34. This versatile usability of the module class 60 means that a shorter development period is supported.

A further advantage of the proxy server 14 is the opportunity to incorporate customer-specific information in the motor vehicle 10. To this end, the proxy server 14 may be coupled to a database 62 that can store information data for the driver, that is to say motor-vehicle-specific data. The motor-vehicle-specific data that are transmitted by the vehicle can provide offers or events that are precisely coordinated to said data. Thus, the database 62 can, by way of example, events for drivers of a specific sports car type stored in it and denoted by the relevant sports car type in a further field, that is to say the sports car type "R8" from the company AUDI AG, for example. If a vehicle, along with its query, sends the "VehicleType R8" to the server application 14, precisely these events are displayed to the driver (provided, of course, that he is in the server application in a context that displays events). However, there could be events or offers for all drivers of a motor vehicle manufacturer, for example, such as tire change at a concessionary rate. However, these offers would nevertheless be intended exclusively for drivers of motor vehicles from this motor vehicle manufacturer, since only these drivers are made aware of this offer via their vehicle. Although this information can be displayed together with information from social networks, such as in a Facebook application under the tab Events together with Facebook events, it is not stored in the Internet portals thereof but rather comes from the server application.

In addition, the proxy server 14 allows the setup of a communication platform for the users of motor vehicles of the same type, such as those of the motor vehicle 10. In the FIGURE, the communication platform is represented by its Internet portal 26. The user interface of the module 58 is denoted by 26'. In the example shown, a separate module 58 has been developed therefore and said user interface has been supplied with content using the proxy server 14 and the database 62. The module 58 can additionally contain functions from the social networks, that is to say, by way of example, "Facebook"®, "Twitter"® and further known networks, and can generate additional customer data, which can be used to make improvements to the motor vehicle type, for business sales and vehicle development.

The described structure of the proxy server 14 has the advantage of simple expandability through new social networks and through new functions. Functions of social networks can be used via other social networks without these functions needing to be customized and reprogrammed for each module. Already existing elements, for example for presenting a profile, can be reused for all social networks. Shorter development times result owing to reusability and an already existing basic framework. In addition, the incorporation of information from the motor vehicle manufacturer, for example, is made possible by a database 62 that is connected to the proxy server 14. Thus, information about advertisement for events, offers and information tailored to the customer, i.e. the driver and his motor vehicle 10, can be conveyed. This information can be made visible exclusively just to the driver, since it is not transmitted to the social networks. Hence, a motor vehicle manufacturer is able to set up direct contact with the users of the motor vehicle from the type of motor vehicle 10. Using the additional social network, customer data can be obtained for business sales or else for the further development of motor vehicles. The linking of the module 58 to functions from already existing social networks is also made possible by the proxy server 14.

The text below once again describes a specific technical implementation for producing a proxy server 14. The proxy server 14 may be a JAVA-based web service that can use a REST interface to communicate with the motor vehicle 10 using http Request/Response. The connection between the proxy server 14 and the portals 20 to 26 for the social networks or the communication platform can likewise be realized on the basis of http Request/Response. The use of an abstract program class allows already existing elements to be reused and jointly used, which facilitates expansion by further networks. By way of example, the module class 60 may be realized as an abstract program class of this kind. An abstract program class provides methods and attributes that are identical and can be reused over different social networks. Alternatively, an abstract class may be limited to partial aspects of a module. By way of example, an abstract class may be provided for profile management in a social network, store the attributes "Surname", "First name", "Address", "Telephone number" and such like personal details for a user of a social network service and, as a method, i.e. as a function that can be activated at the Internet portal, have a graphical user interface for displaying the profile, as needed by the motor vehicle. This method can thus generate the necessary graphical display data from the attribute values.

The database 62 can be connected to the web service of the proxy server 14 by a JDBC (Java Database Connectivity Library) driver. The proxy server 14 can thus convert the information received from the social networks and the data information from the database into SCXML by the web service using SCXML templates and can then send it to the motor vehicle 10. The product Oracle Database 10g Express Edition from the company Oracle has been found to be a suitable database.

In order to ensure secured and encrypted access by the modules 52 to 58 to the respective Internet portals 20 to 26, it is possible for the modules 52 to 58 to be authenticated by the online authentication mechanism "oAuth", for example.

The examples show how modules for user control of Internet portals for social networks can be provided by an immobile proxy device and can be updated or replaced in a simple manner without this requiring complex alteration in the individual motor vehicles that use the proxy device.

The proxy and the connected database allow the display of events and offers that are specifically coordinated for customers. Use of functions of other social networks from an application should also be mentioned. These are principal parts of the server application. The core is the server application, which, together with a database, integrates customer-specific information into the applications of social networks in the vehicle and allows further networks to be integrated in the simple manner and the functions of said networks to be made available to the other applications.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for controlling Internet portals for respective social network services from a motor vehicle, comprising:
    providing an immobile proxy device for user control of the Internet portals, the proxy device being separate from the motor vehicle and separate from Internet servers that each provide one the Internet portals;
    providing a user interface from the proxy device, the user interface being provided to the motor vehicle for communication with the motor vehicle;
    receiving via the user interface, user selections for functions of the Internet portals; and
    providing a plurality of modules by the proxy device, each module communicating with a different respectively designated Internet portal such that when each module receives a user selection for a function of the respectively designated Internet portal, the module takes the selection as a basis for sending a control command to the respectively designated Internet portal, for activating a function of the respectively designated Internet portal, the control command being specific to an Application Programming Interface (API) of the respectively designated Internet portal, wherein
    each module receives output data from the respectively designated Internet portal, the output data being specific to the API of the respectively designated Internet portal,
    each module produces graphical display data from the output data,
    the graphical display data is sent to the motor vehicle for displaying the output data on a display device of the motor vehicle,
    when a first of the modules receives a user selection for a common function, the first module transmits the user selection for the common function to at least a second of the modules, and the first and second modules send respective control commands, which are specific to the APIs of the respectively designated Internet portals, for activating the common function at the respectively designated Internet portals, so that one user selection is used to activate the common function at a plurality of Internet portals,
    the proxy device receives motor-vehicle-specific data from an external data source different from the proxy device and different from the Internet portals, the motor-vehicle-specific data being intended for the motor vehicle,
    the motor-vehicle-specific data are combined with output data to form user-specific graphical display data, and
    the user-specific graphical display data are sent to the motor vehicle to jointly present information associated with the output data and the motor-vehicle-specific data.

2. The method according to claim 1, wherein
    each module produces graphical display data for at least one control panel element, each control panel element being displayed on the display device of the motor vehicle, and
    the user activates each control panel element for selecting a corresponding function.

3. The method according to claim 2, wherein the user activates each control panel element by clicking on the control panel element.

4. The method according to claim 1, wherein
the proxy device has a user community module,
the user community module provides a communication platform for users of the proxy device, and
each user controls the communication platform via the user community module of the proxy device.

5. The method according to claim 4, wherein the user community module provides a communication platform for drivers of motor vehicles of a particular type.

6. The method according to claim 1, wherein
the modules receive user selections from the motor vehicle by way of selection commands transmitted from the motor vehicle, and
the selection commands are based on a Representational State Transfer (REST) standard.

7. The method according to claim 1, wherein the control commands sent from the modules to the Internet portals are based on a Representational State Transfer (REST) standard.

8. The method according to claim 1, wherein the modules produce the graphical display data based on a State Chart Extensible Markup Language (SCXML) standard.

9. The method according to claim 1, wherein at least two of the modules are formed from a common module class such that a standard user interface is provided to the motor vehicle.

10. The method according to claim 1, wherein each module provides the user interface for the respectively designated internet portal.

11. The method according to claim 1, wherein each module communicates with the motor vehicle via a vehicle programming interface different from the API of the respectively designated internet portal.

12. The method according to claim 11, wherein output data is translated from the API of the respectively designated internet portal and combined with additional data from an additional data source, to produce graphical display data specific to the vehicle programming interface.

13. The method according to claim 1, wherein each module translates the output data from the API of the respectively designated internet portal to a vehicle programming interface, for producing the graphical display data.

14. The method according to claim 1, wherein each module is updated when the social network service of the respectively designated internet portal is updated, without requiring an update to the motor vehicle.

15. The method according to claim 1, wherein
the user selection for the common function relates to posting a message, and
the user selection for the common function causes a message to be posted in a plurality of social networks.

16. A server arrangement to control Internet portals for respective social network services from a motor vehicle, the server arrangement comprising:
an immobile proxy device for user control of the Internet portals, the proxy device being separate from Internet servers that each provide one the Internet portals;
a user interface provided from the proxy device, the user interface being provided to the motor vehicle for communication with the motor vehicle, the user interface receiving user selections for functions of the Internet portals;
a plurality of modules by the proxy device, each module communicating with a different respectively designated Internet portal such that when each module receives a user selection for a function of the respectively designated Internet portal, the module takes the selection as a basis for sending a control command to the respectively designated Internet portal, for activating a function of the respectively designated Internet portal, the control command being specific to an Application Programming Interface (API) of the respectively designated Internet portal; and
a motor-vehicle-specific database linked to the immobile proxy device to receive from the immobile proxy device, customer data regarding the user, and to provide offer information for visible presentation to the user via the immobile proxy device, the offer information being specific to the user and the user's motor vehicle, the offer information being provided via the immobile proxy device without transmitting the offer information to the Internet portals, wherein
each module receives output data from the respectively designated Internet portal, the output data being specific to the API of the respectively designated Internet portal,
each module produces graphical display data from the output data,
the graphical display data is sent to the motor vehicle for displaying the output data on a display device of the motor vehicle, and
when a first of the modules receives a user selection for a common function, the first module transmits the user selection for the common function to at least a second of the modules, and the first and second modules send respective control commands, which are specific to the APIs of the respectively designated Internet portals, for activating the common function at the respectively designated Internet portals, so that one user selection is used to activate the common function at a plurality of Internet portals.

17. The server arrangement according to claim 16, wherein
the user selection for the common function relates to posting a message, and
the user selection for the common function causes a message to be posted in a plurality of social networks.

* * * * *